(12) United States Patent
Xu et al.

(10) Patent No.: US 10,352,361 B2
(45) Date of Patent: Jul. 16, 2019

(54) THREE-ROWS-OF-BALL BEARINGS SLIDING RAIL

(71) Applicant: WUXI HAIDAER PRECISION SLIDES CO., LTD, Wuxi, Jiangsu (CN)

(72) Inventors: Xinglong Xu, Jiangsu (CN); Haiwen Zhang, Jiangsu (CN); Feng Qian, Jiangsu (CN)

(73) Assignee: WUXI HAIDAER PRECISION SLIDES CO., LTD, Wuxi, Jiangsu (CN)

( * ) Notice: Subject to any disclaimer, the term of this patent is extended or adjusted under 35 U.S.C. 154(b) by 0 days.

(21) Appl. No.: 15/774,588

(22) PCT Filed: Apr. 28, 2016

(86) PCT No.: PCT/CN2016/080460
§ 371 (c)(1),
(2) Date: May 9, 2018

(87) PCT Pub. No.: WO2017/128535
PCT Pub. Date: Aug. 3, 2017

(65) Prior Publication Data
US 2018/0320738 A1    Nov. 8, 2018

(30) Foreign Application Priority Data

Jan. 27, 2016 (CN) .......................... 2016 1 0054110

(51) Int. Cl.
| | |
|---|---|
| *F16C 29/04* | (2006.01) |
| *A47B 1/00* | (2006.01) |
| *A47B 88/49* | (2017.01) |
| *A47B 88/493* | (2017.01) |
| *F16C 29/00* | (2006.01) |

(52) U.S. Cl.
CPC .......... *F16C 29/048* (2013.01); *A47B 88/493* (2017.01); *F16C 29/04* (2013.01);
(Continued)

(58) Field of Classification Search
CPC .... F16C 29/005; F16C 29/04; F16C 2314/00; F16C 2314/72; F16C 29/048;
(Continued)

(56) References Cited

U.S. PATENT DOCUMENTS 4,606,588 A * 8/1986 Koch .................. A47B 88/487
248/430
4,752,142 A * 6/1988 Jackson ............... A47B 88/487
384/18

(Continued)

FOREIGN PATENT DOCUMENTS

CN     103096756 A     5/2013

*Primary Examiner* — Marcus Charles

(57) ABSTRACT

A three-rows-of-ball bearings sliding rail is disclosed. An inner sliding rail body is supported in outer sliding rail bodies through three rows of support ball bearings which are arranged in parallel in a lengthwise direction of the inner sliding rail body. The three rows of support ball bearings are respectively limited within a length range of the outer sliding rail bodies via ball retainers. Each of the outer sliding rail bodies includes a bottom plate, a first side wall and a second side wall which are respectively located at two sides in a widthwise direction of the bottom plate, are integrally formed with the bottom plate and extended in a lengthwise direction of the bottom plate. The first side wall includes a first arm and a supporting part which is bent inwardly and extends horizontally from a bottom end of the first arm.

6 Claims, 5 Drawing Sheets

(52) U.S. Cl.
CPC ......... *A47B 1/00* (2013.01); *A47B 2210/0032* (2013.01); *A47B 2210/0051* (2013.01); *A47B 2210/0056* (2013.01); *F16C 29/005* (2013.01); *F16C 2314/00* (2013.01); *F16C 2314/72* (2013.01)

(58) Field of Classification Search
CPC .... F16F 29/048; A47B 88/487; A47B 88/493; A47B 2210/004; A47B 2210/0056; A47B 2210/0059; A47B 2210/0051; F24C 15/168
USPC ..... 384/18, 21, 23, 35, 49; 312/331, 334.16, 312/334.5, 334.6, 334.11, 334.17
See application file for complete search history.

(56) References Cited

U.S. PATENT DOCUMENTS

| | | | | |
|---|---|---|---|---|
| 4,752,143 A | * | 6/1988 | Lautenschlager, Jr. | ...................... A47B 88/487 312/334.31 |
| 5,570,943 A | * | 11/1996 | Schroder | ............... A47B 88/493 312/334.11 |
| 5,775,788 A | * | 7/1998 | Sasse | ................... A47B 88/487 312/334.11 |
| 6,132,020 A | * | 10/2000 | Schael | ................ A47B 88/493 312/334.1 |
| 8,882,351 B2 | * | 11/2014 | Jahrling | ................ F24C 15/168 384/18 |
| 2006/0273705 A1 | * | 12/2006 | Yeh | ...................... A47B 88/493 312/334.31 |
| 2008/0157643 A1 | * | 7/2008 | Chen | ...................... A47B 88/47 312/334.6 |
| 2009/0195131 A1 | * | 8/2009 | Chi | ...................... A47B 88/467 312/319.1 |
| 2011/0241515 A1 | * | 10/2011 | Park | ...................... F24C 15/168 312/408 |
| 2011/0249921 A1 | * | 10/2011 | Huang | .................. F16C 29/041 384/18 |
| 2013/0336602 A1 | * | 12/2013 | Jahrling | ................ F24C 15/168 384/49 |
| 2015/0252843 A1 | | 9/2015 | Bachor et al. | |

* cited by examiner

THREE-ROWS-OF-BALL BEARINGS SLIDING RAIL

CROSS REFERENCE OF RELATED APPLICATION

This is a U.S. National Stage under 35 U.S.C 371 of the International Application PCT/CN2016/080460, filed Apr. 28, 2016, which claims priority under 35 U.S.C. 119(a-d) to CN 201610054110.5, filed Jan. 27, 2016.

BACKGROUND OF THE PRESENT INVENTION

Field of Invention

The present invention relates to a field of slide rail parts, more particularly to a slide rail part for household appliances, and specifically a three-rows-of-ball bearings slide rail.

Description of Related Arts

The existing three-rows-of-ball bearings sliding rail, such as Drawing Guided Device published by CN 103096756B, whose inner sliding rail body is supported in at least one outer sliding rail body through three rows of support ball bearings which are arranged in parallel in a lengthwise direction of the inner sliding rail body, wherein the three rows of support ball bearings are limited within a length range of the outer sliding rail body via the ball retainer, and positioned at three adjacent inner corner ends of the outer sliding rail body through the ball retainer in the cross section of the outer sliding rail body, so that connection lines of ball centers of the three rows of support ball bearings form a right triangle. Generally, the three rows of support ball bearings are able to stably support the inner sliding rail body in the outer sliding rail body, so as to effectively reduce the shake clearance of the inner sliding rail body to avoid the radial shaking of the inner sliding rail body in the cross section of the outer sliding rail body. Therefore, the current three-rows-of-ball bearings sliding rails are mostly applied to large capacity drawers or pull-out baskets of furniture or household appliances, such as large capacity drawers or pull-out baskets of refrigerators, ovens, dishwashers and furniture, so as to ensure the stability of the open or close of the drawers and pull-out baskets. However, the existing three-rows-of-ball bearings sliding rail still has the problem of insufficient bearing capacity; when the long-term load of the drawers and pull-out baskets is larger, and especially when the pushing or pulling force perpendicularly to the surface of the outer sliding rail body is applied to the outer sliding rail body, the arc-shaped faces of the inner sliding rail body contacting with the three rows of ball bearings are deformed due to non-uniform force, even the drawers or the pull-out baskets are stuck under severe circumstances. Moreover, the existing three-rows-of-ball bearings sliding rail also has the problem of large appearance size, so that it is unable to meet installation space requirements of the hidden slide system with smaller installation space.

SUMMARY OF THE PRESENT INVENTION

Aiming at the above technical problem, the present invention provides a three-rows-of-ball bearings sliding rail, which is able to solve the problem of insufficient bearing capacity in the existing three-rows-of-ball bearings sliding rail, and is able to meet installation space requirements for a hidden sliding rail.

A technical solution of the present invention is as follows. A three-rows-of-ball bearings sliding rail comprises an inner sliding rail body and at least one outer sliding rail body, wherein the inner sliding rail body is respectively supported in the outer sliding rail body through three rows of support ball bearings which are arranged in parallel in a lengthwise direction of the inner sliding rail body; the three rows of support ball bearings are respectively limited within a length range of the outer sliding rail body via a ball retainer; the inner sliding rail body translates along the outer sliding rail body under a support of the three rows of support ball bearings; the outer sliding rail body comprises a bottom plate, a first side wall and a second side wall which are respectively located at two sides in a widthwise direction of the bottom plate, are integrally formed with the bottom plate and extended in a lengthwise direction of the bottom plate; the first side wall comprises a first arm and a supporting part which is bent inwardly and extends horizontally from a bottom end of the first arm; the second side wall comprises a second arm and an arc-shaped part which is bent inwardly from a bottom end of the second arm and integrally formed with the second arm; each group of the three rows of support ball bearings are respectively located within an upper inner corner end and a lower inner corner end of the first side wall, and the arc-shaped part in a cross section of the outer sliding rail body; and connection lines of centers of each group of the three rows of support balls form an equilateral triangle in the cross section of the outer sliding rail body; the inner sliding rail body has multiple arc-shaped faces which respectively match with ball profiles of the three rows of support ball bearings.

Preferably, a horizontal extension end portion of the supporting part of the first side wall exceeds a ball center position of the row of support ball bearings located at the lower inner corner end of the first side wall.

Preferably, multiple first stop blocks are located at two end portions of the bottom plate of the outer sliding rail body in a lengthwise direction of the ball retainer, and are formed by inwardly punching the bottom plate of the outer sliding rail body.

Preferably, multiple second stop blocks are respectively arranged at two end portions of the inner sliding rail body in the lengthwise direction of the ball retainer.

More preferably, the second stop blocks, having a circular shape, are located at flanges of the two sides of the inner sliding rail body which faces towards the bottom plate of the outer sliding rail body.

More preferably, the inner sliding rail body comprises a support for supporting the row of support ball bearings located within the arc-shaped part; the second stop blocks are located at the two end portions of the support in the lengthwise direction of the ball retainer and are formed by punching the support.

Beneficially effects of the three-rows-of-ball bearings sliding rail provided by the present invention are as follows. The three rows of support ball bearings are respectively located within the upper inner corner end and the lower inner corner end of the first side wall, and the arc-shaped part in a cross section of the outer sliding rail body; and connection lines of centers of the three rows of support balls form an equilateral triangle in the cross section of the outer sliding rail body; so that the carrying capacity of the three-rows-of-ball bearings sliding rail provided by the present invention is larger than that of the existing sliding rail with a right triangle distribution, and especially when a larger pushing or pulling force perpendicularly to a surface of the sliding rail is applied to the outer sliding rail body, the force of the inner sliding rail body from the three rows of support ball bearings, which are distributed in the equilateral triangle manner within the cross section of the inner sliding rail body, is more uniform, for effectively avoiding the deformation of the sliding rail due to the non-uniform force of the inner sliding rail body, so as to prevent the drawer or pull-out basket from being stuck, thus ensuring the whole sliding rail system is more stable and reliable. Simultaneously, under the same carrying capacity, the cross section of the three-rows-of-ball bearings sliding rail provided by the present invention is smaller than that of the existing sliding rails, which meets installation and usage requirements of the hidden slide system with smaller installation space.

Figure 1:
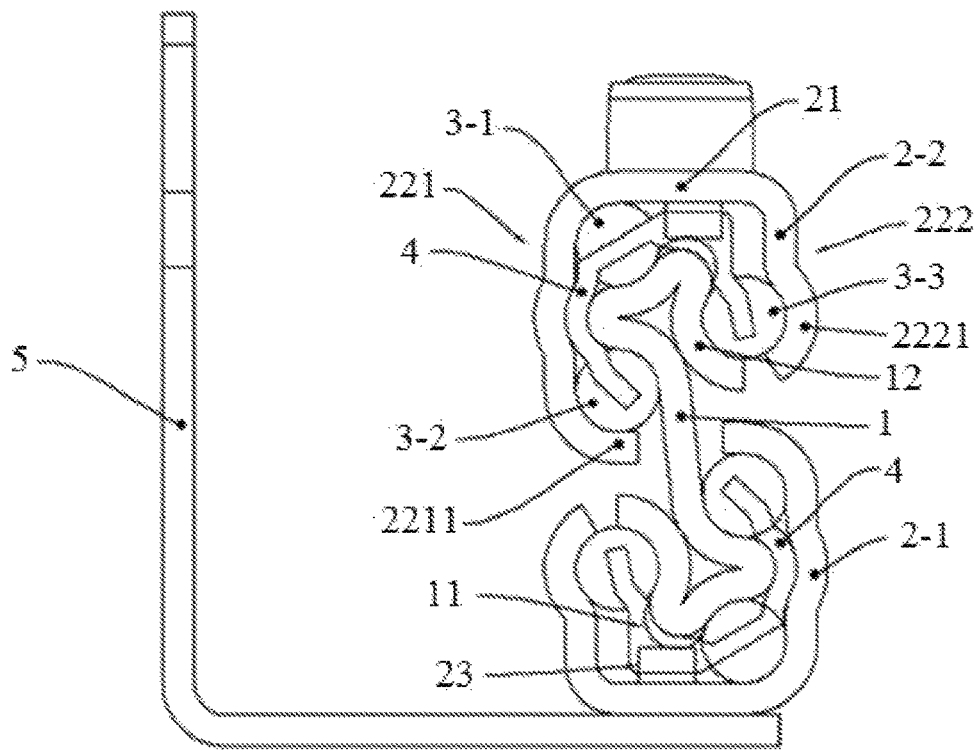
FIG. 1 is a cross section diagram of a three-rows-of-ball bearings sliding rail according to a preferred embodiment of the present invention.
Figure 2:
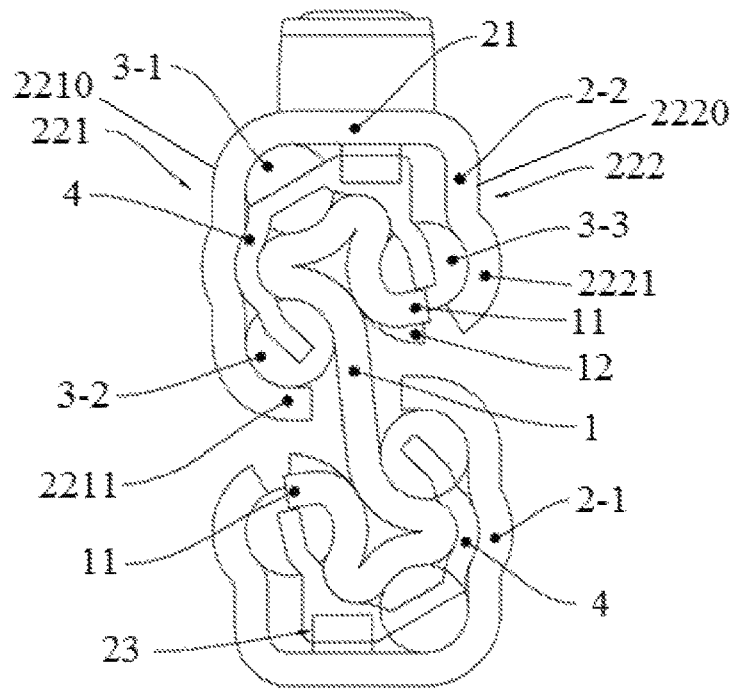
FIG. 2 is a cross section diagram of a three-rows-of-ball bearings sliding rail according to another preferred embodiment of the present invention.

In the drawings, 1: inner sliding rail body; 11: second stop block; 12: support; 2-1: outer sliding rail body; 2-2: outer sliding rail body; 3-1: support ball bearing; 3-2: support ball bearing; 3-3: support ball bearing; 4: ball retainer; 21: bottom plate; 221: first side wall; 2210: first arm; 2211: supporting part; 222: second side wall; 2220: second arm; 2221: arc-shaped part; 23: first stop block; 5: stand.

DETAILED DESCRIPTION OF THE PREFERRED EMBODIMENT

Figure 7:
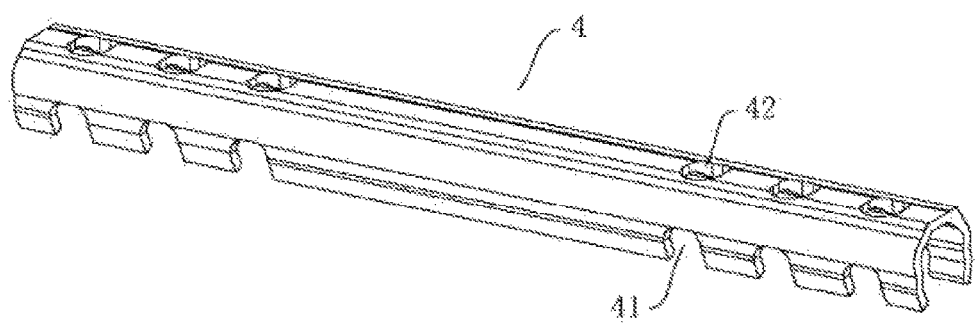
FIG. 7 is a structurally schematic view of a ball retainer at a first perspective of the three-rows-of-ball bearings sliding rail provided by the present invention.
Figure 8:
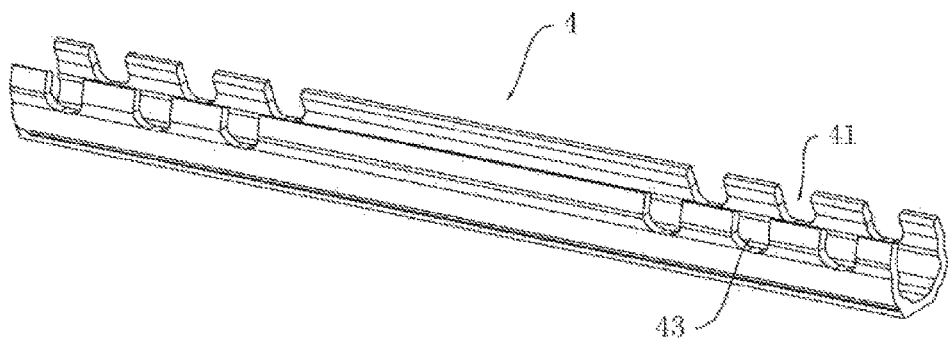
FIG. 8 is a structurally schematic view of the ball retainer at a second perspective of the three-rows-of-ball bearings sliding rail provided by the present invention.

Referring to FIG. 1, a three-rows-of-ball bearings sliding rail is illustrated, which comprises an inner sliding rail body 1 and at least one outer sliding rail body. In this embodiment, there are two outer sliding rail bodies, that is, the outer sliding rail body 2-1 and the outer sliding rail body 2-2. The outer sliding rail body 2-1 is fixed to a body of furniture or household appliances through a stand 5, the outer sliding rail body 2-2 is fixed to an outer side wall of a drawer, the inner sliding rail body 1 is respectively supported in the outer sliding rail bodies 2-1 and 2-2 through two groups of three rows of support ball bearings 3-1, 3-2 and 3-3 which are arranged in parallel in a lengthwise direction of the inner sliding rail body; the two groups of three rows of support ball bearings 3-1, 3-2 and 3-3 are respectively limited within a length range of the outer sliding rail bodies 2-1 and 2-2 via two ball retainers 4; each of the ball retainers 4 has three slots 41, 42 and 43 (as shown in FIGS. 7 and 8) respectively provided on three slot surfaces thereof for accommodating and limiting the support ball bearings; the inner sliding rail body 1 respectively translates along the outer sliding rail bodies 2-1 and 2-2 under the support of the two groups of three rows of support ball bearings 3-1, 3-2 and 3-3. The outer sliding rail body 2-1 and the outer sliding rail body 2-2 are same in structure. Take the outer sliding rail body 2-2 as an example, the outer sliding rail body 2-2 comprises a bottom plate 21, a first side wall 221 and a second side wall 222 which are respectively located at two sides in a widthwise direction of the bottom plate 21, are integrally formed with the bottom plate and extended in a lengthwise direction of the bottom plate. The first side wall 221 comprises a first arm 2210 and a supporting part 2211 which is bent inwardly and extends horizontally from a bottom end of the first arm 2210. The second side wall 222 comprises a second arm 2220 and an arc-shaped part 2221 which is bent inwardly from a bottom end of the second arm 2220 and integrally formed with the second arm 2220. Each group of the three rows of support ball bearings 3-1, 3-2 and 3-3 are respectively located within an upper inner corner end and a lower inner corner end of the first side wall 221, and the arc-shaped part 2221 in a cross section of the outer sliding rail body; and connection lines of centers of each group of the three rows of support balls 3-1, 3-2 and 3-3 form an equilateral triangle in the cross section of the outer sliding rail body. The inner sliding rail body 1 has multiple arc-shaped faces which respectively match with ball profiles of the two groups of three rows of support ball bearings 3-1, 3-2 and 3-3. A horizontal extension end portion of the supporting part 2211 of the first side wall 221 exceeds a ball center position of the row of support ball bearings 3-2 located at the lower inner corner end of the first side wall.

Figure 9:
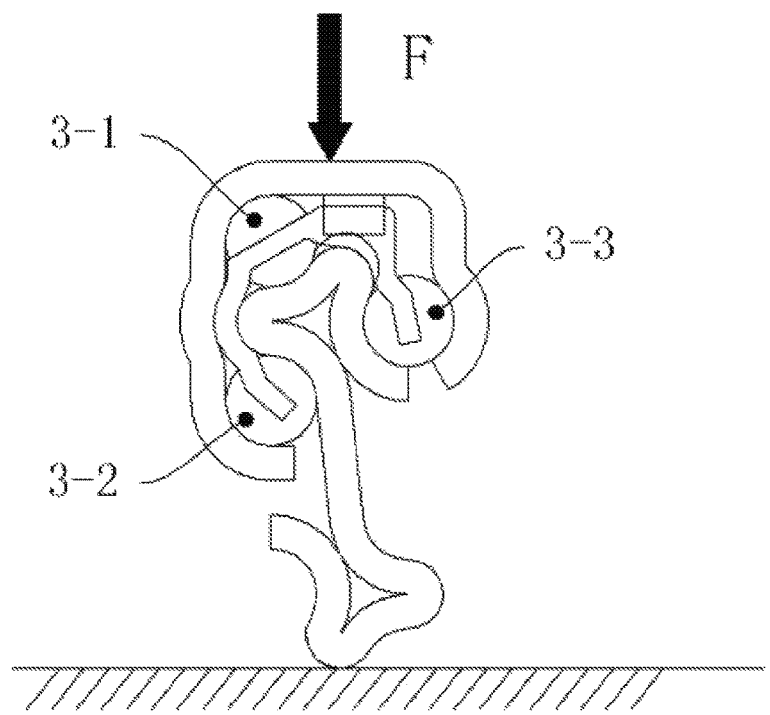
FIG. 9 shows a pushing force F is applied to the outer sliding rail body of the three-rows-of-ball bearings sliding rail provided by the present invention.
Figure 10:
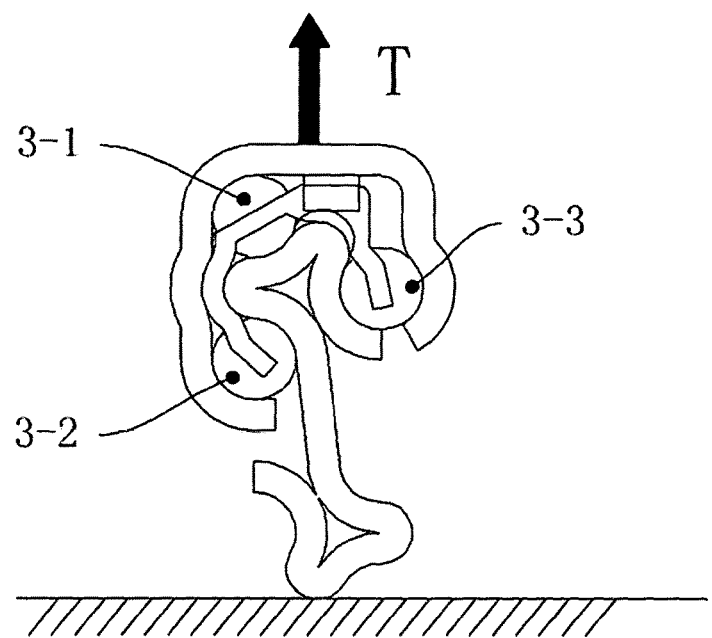
FIG. 10 shows a pulling force T is applied to the outer sliding rail body of the three-rows-of-ball bearings sliding rail provided by the present invention.

In the three-rows-of-ball bearings sliding rail provided by the present invention, when a pushing force F perpendicularly to an outer sliding rail body surface is applied to the outer sliding rail body, as shown in FIG. 9, the pushing force is transferred to the inner sliding rail body through one group of three rows of support ball bearings 3-1, 3-2 and 3-3; since the group of three rows of support ball bearings 3-1, 3-2 and 3-3 are arranged to around the inner sliding rail body in an equilateral triangle manner, and all of the inner sliding rail body, the outer sliding rail body and the group of three rows of support ball bearings 3-1, 3-2 and 3-3 contact with other through in an arc-shaped fitting manner, so as to ensure a force equilibrium of the inner sliding rail body and the outer sliding rail body.

Figure 3:
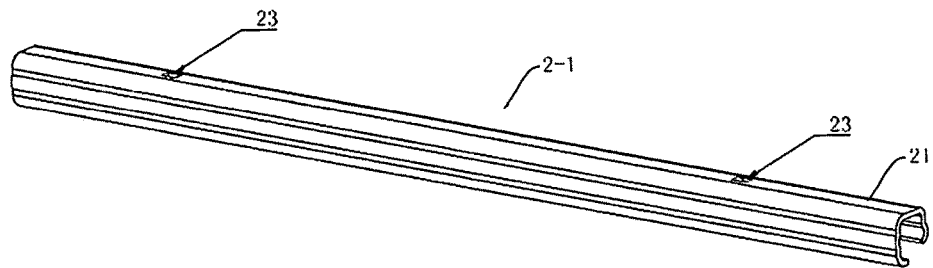
FIG. 3 is a structurally schematic view of an outer sliding rail body of the three-rows-of-ball bearings sliding rail provided by the present invention.

Referring to FIG. 3, two first stop blocks 23 are respectively located at two end portions of the bottom plate 21 of each of both the outer sliding rail body 2-1 and the outer sliding rail body 2-2 in a lengthwise direction of the ball retainers 4. The first stop blocks 23 are formed by inwardly punching the bottom plate 21 of the outer sliding rail body.

Figure 4:
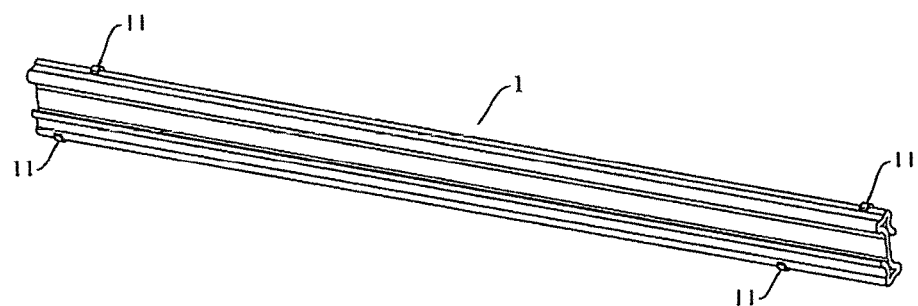
FIG. 4 is a structurally schematic view of an inner sliding rail body of the three-rows-of-ball bearings sliding rail provided by the present invention.

Referring to FIG. 4, two second stop blocks 11 are respectively arranged at two end portions of the inner sliding rail body 1 in the lengthwise direction of one of the ball retainers 4. The second stop blocks 11, having a circular shape, are located at flanges of a side of the inner sliding rail body 1 which faces towards the bottom plate 21 of the outer sliding rail body.

Figure 5:
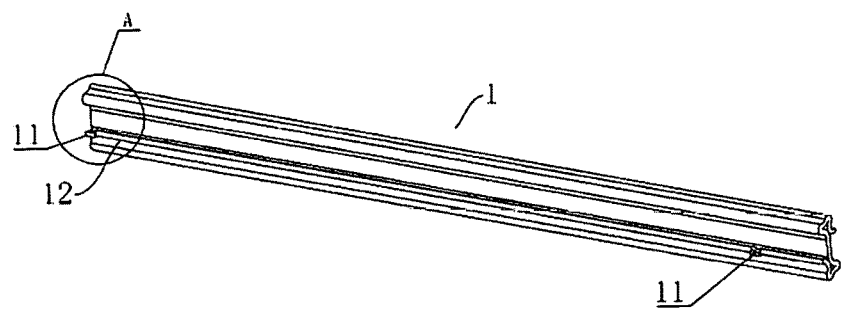
FIG. 5 is another structurally schematic view of the inner sliding rail body of the three-rows-of-ball bearings sliding rail provided by the present invention.
Figure 6:
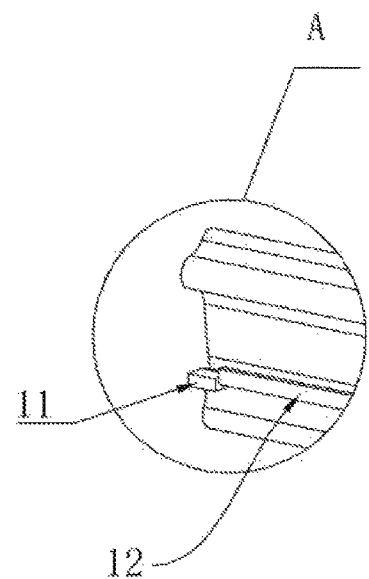
FIG. 6 is a partially enlarged diagram of A-portion in FIG. 5.

As shown in FIGS. 5 and 6, according to another preferred embodiment of the present invention, the inner sliding rail body 1 comprises a support 12 for supporting the row of support ball bearings 3-3 located within the arc-shaped part 2221. Two second stop blocks 11 are located at two end portions of the support 12 in the lengthwise direction of one of the ball retainers 4 and are formed by punching the support 12.

What is claimed is:

1. A three-rows-of-ball bearings sliding rail, which comprises an inner sliding rail body and at least one outer sliding rail body, wherein the inner sliding rail body is respectively supported in the outer sliding rail body through three rows of support ball bearings which are arranged in parallel in a lengthwise direction of the inner sliding rail body; the three rows of support bail bearings are respectively limited within a length range of the outer sliding rail body via a ball retainer; the inner sliding rail body translates along the outer sliding rail body under a support of the three rows of support ball bearings; the outer sliding rail body comprises a bottom plate, a first side wall and a second side wall which are respectively located at two sides in a widthwise direction of the bottom plate, are integrally formed with the bottom plate and extended in a lengthwise direction of the bottom plate; the first side wall comprises a first arm and a supporting part which is bent inwardly and extends horizontally from a bottom end of the first arm; the second side wall comprises a second arm and an arc-shaped part which is bent inwardly from a bottom end of the second arm and integrally formed with the second arm; each group of the three rows of support ball bearings are respectively located within an upper inner corner end and a lower inner corner end of the first side wall, and the arc-shaped part in a cross section of the outer sliding rail body; the arc-shaped part of the second side wall is located below the upper inner corner end of the first side wall, and located above the lower inner corner end of the first side wall in the cross section of the outer sliding rail body; connection lines of centers of each group of the three rows of support balls form an equilateral triangle in the cross section of the outer sliding rail body; the inner sliding rail body has multiple arc-shaped faces which respectively match with ball profiles of the three rows of support ball bearings.

2. The three-rows-of-ball bearings sliding rail, as recited in claim 1, wherein a horizontal extension end portion of the supporting part of the first side wall exceeds a ball center position of the row of support ball bearings located at the lower inner corner end of the first side wall.

3. The three-rows-of-ball bearings sliding rail, as recited in claim 2, wherein multiple first stop blocks are located at two end portions of the bottom plate of the outer sliding rail body in a lengthwise direction of the ball retainer, and are formed by inwardly punching the bottom plate of the outer sliding rail body.

4. The three-rows-of-ball bearings sliding rail, as recited in claim 3, wherein multiple second stop blocks are respectively arranged at two end portions of the inner sliding rail body in the lengthwise direction of the ball retainer.

5. The three-rows-of-ball bearings sliding rail, as recited in claim 4, wherein the second stop blocks, having a circular shape, are located at flanges of the two sides of the inner sliding rail body which faces towards the bottom plate of the outer sliding rail body.

6. The three-rows-of-ball bearings sliding rail, as recited in claim 4, wherein the inner sliding rail body comprises a support for supporting the row of support ball bearings located within the arc-shaped part; the second stop blocks are located at the two end portions of the support in the lengthwise direction of the ball retainer and are formed by punching the support.

* * * * *